(12) United States Patent
Kulkarni et al.

(10) Patent No.: US 10,474,536 B2
(45) Date of Patent: Nov. 12, 2019

(54) CALCULATING BANDWIDTH REQUIREMENTS FOR A SPECIFIED RECOVERY POINT OBJECTIVE

(71) Applicant: International Business Machines Corporation, Armonk, NY (US)

(72) Inventors: Shweta V. Kulkarni, Nashik (IN); Subhojit Roy, Pune (IN); William J. Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 14/735,964

(22) Filed: Jun. 10, 2015

(65) Prior Publication Data
US 2016/0364300 A1 Dec. 15, 2016

(51) Int. Cl.
*G06F 11/14* (2006.01)
(52) U.S. Cl.
CPC ...... *G06F 11/1461* (2013.01); *G06F 11/1456* (2013.01)
(58) Field of Classification Search
CPC .......................... G06F 11/1461; G06F 11/1456
USPC .......................................................... 707/655
See application file for complete search history.

(56) References Cited

U.S. PATENT DOCUMENTS

| | | | |
|---|---|---|---|
| 6,324,654 B1* | 11/2001 | Wahl ................... | G06F 11/2066 707/999.202 |
| 7,577,805 B2 | 8/2009 | Amano et al. | |
| 7,734,950 B2 | 6/2010 | Rogers | |
| 2005/0010731 A1* | 1/2005 | Zalewski ............ | G06F 11/2058 711/162 |
| 2006/0253731 A1* | 11/2006 | Petruzzo ............. | G06F 11/1456 714/6.2 |
| 2007/0168692 A1* | 7/2007 | Quintiliano ......... | G06F 11/1662 714/4.1 |
| 2008/0177963 A1* | 7/2008 | Rogers ................ | G06F 11/2071 711/162 |
| 2008/0209145 A1* | 8/2008 | Ranganathan ...... | G06F 11/2074 711/162 |
| 2009/0157768 A1* | 6/2009 | Ichikawa ............ | G06F 11/2066 |
| 2013/0080841 A1* | 3/2013 | Reddy ................. | H04L 43/0876 714/47.3 |
| 2013/0226870 A1* | 8/2013 | Dash ..................... | G06F 3/0619 707/634 |
| 2014/0236891 A1* | 8/2014 | Talius .................... | G06F 11/00 707/613 |
| 2014/0281809 A1* | 9/2014 | Billa ................. | G06F 17/30327 714/764 |
| 2014/0297588 A1 | 10/2014 | Babashetty et al. | |

(Continued)

OTHER PUBLICATIONS

Patterson et al., "SnapMirror®: File System Based Asynchronous Mirroring for Disaster Recovery", USENIX Association, Proceedings of the FAST 2002 Conference on File and Storage Technologies, Jan. 28-30, 2002, 14 pages, Monterey, California, USA, © 2002 by the USENIX Association.

(Continued)

*Primary Examiner* — Jensen Hu
(74) *Attorney, Agent, or Firm* — Rakesh Roy

(57) ABSTRACT

Determining the bandwidth required for data replication for disaster recovery. Given a specified recovery point objective (RPO), bandwidth requisitioning and usage is determined according to meet the RPO based on observed factors.

15 Claims, 4 Drawing Sheets

(56) References Cited

U.S. PATENT DOCUMENTS

2014/0324774 A1    10/2014   Chen et al.
2015/0112933 A1*   4/2015    Satapathy ........... H04L 41/5019
                                                              707/634

OTHER PUBLICATIONS

Mell et al., "The NIST Definition of Cloud Computing," National Institute of Standards and Technology, Sep. 2011, p. 1-3, Special Publication 800-145.

* cited by examiner

US 10,474,536 B2

CALCULATING BANDWIDTH REQUIREMENTS FOR A SPECIFIED RECOVERY POINT OBJECTIVE

BACKGROUND

The present invention relates generally to the field of file or database maintenance, and more particularly to database backup.

Remote data mirroring is an important part of an organizational disaster recovery strategy. An organization performs operations on a primary data set, then forwards the operations to a remote site maintaining a secondary data set. The mirroring process includes the duplication of operations on the secondary data set. An important factor in an organization's ability to timely forward operations to the remote site maintaining the secondary data set is the bandwidth provided for the process. The amount of bandwidth provided has financial implications for the organization. Bandwidth is a measure of the rate of data transferred per unit time. The metric that tracks the maximum amount of data that a system could lose in a disaster scenario is the recovery point objective (RPO). The RPO is a time period used to determine the amount of data that can be lost. The RPO may calculated as a function of a time period and an amount of data that an organization is willing to put at risk in a disaster scenario.

SUMMARY

According to an aspect of the present invention, there is a method, computer program product, and/or system that performs the following steps (not necessarily in the following order): (i) receiving a recovery point objective; (ii) performing a set of operation instructions; (iii) collecting a set of data correlating to a set of bandwidth factors, based on the set of operation instructions; and (iv) calculating a bandwidth, based, at least in part, on the set of bandwidth factors and the recovery point objective. At least the collecting step is performed by computer software running on computer hardware.

DETAILED DESCRIPTION

Figure 1:
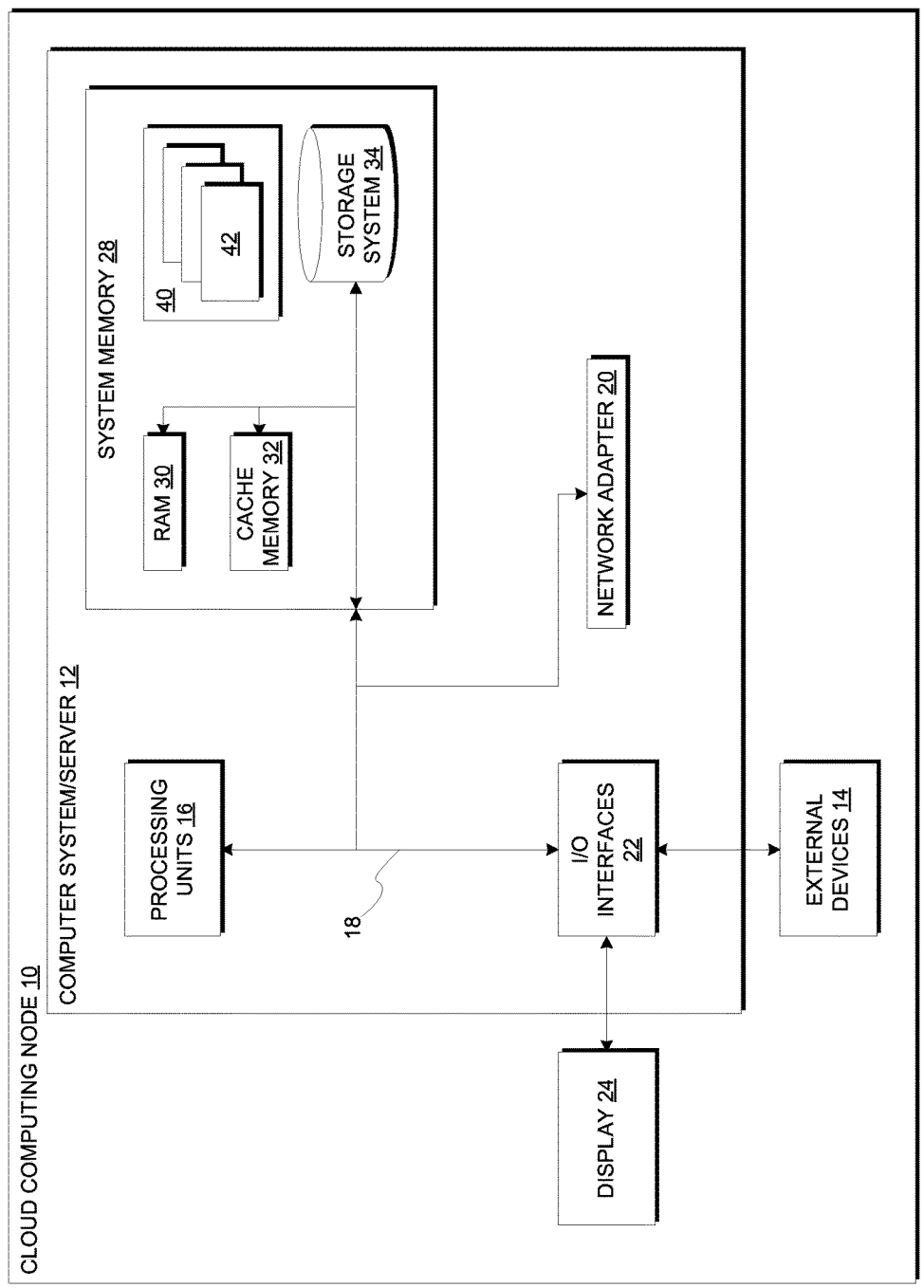
FIG. 1 depicts a cloud computing node used in a first embodiment of a system according to the present invention.

Determining the bandwidth required for data replication for disaster recovery. Given a specified recovery point objective (RPO), bandwidth requisitioning and usage is determined according to meet the RPO based on observed factors. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
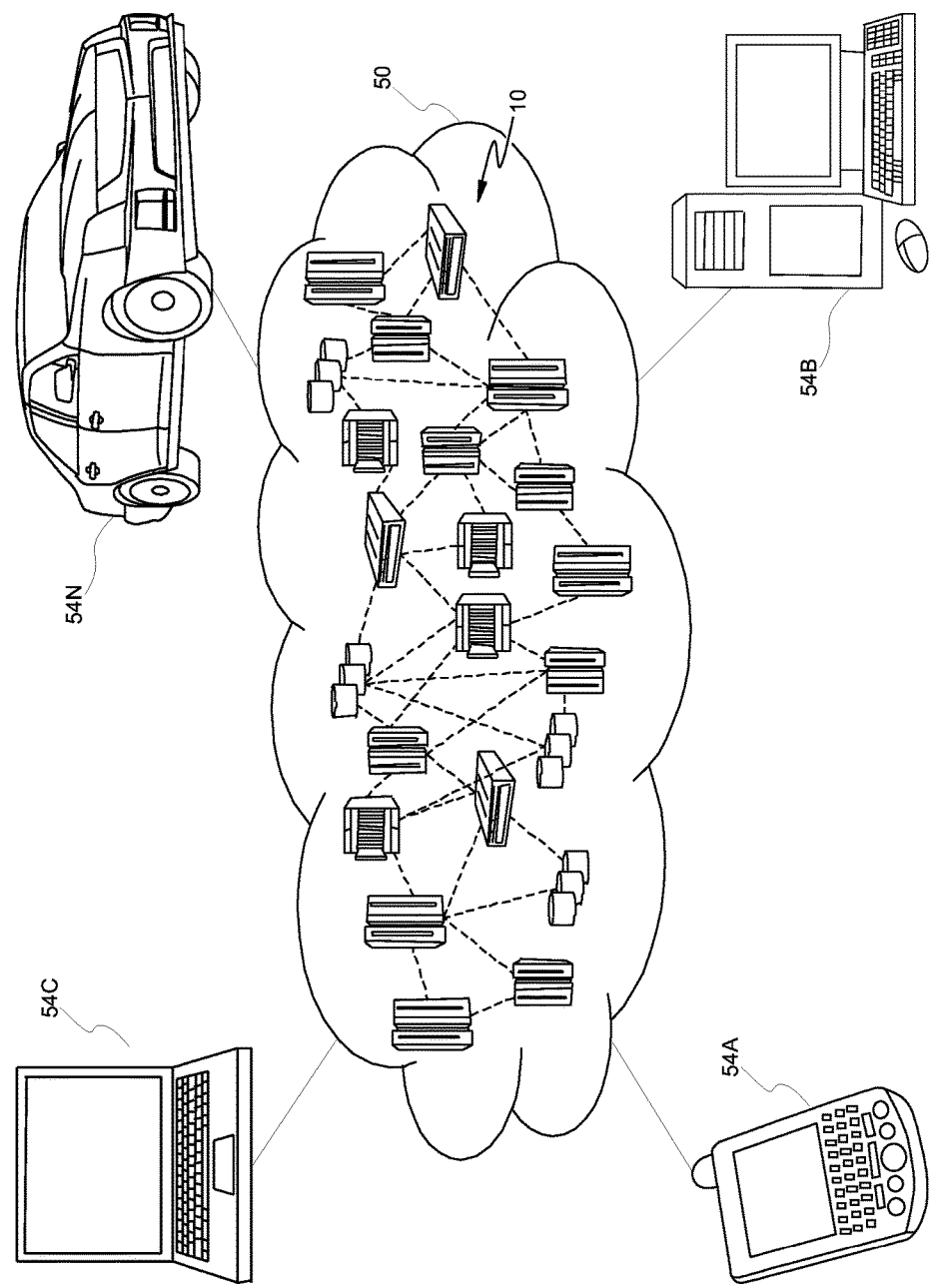
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate. One or more cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
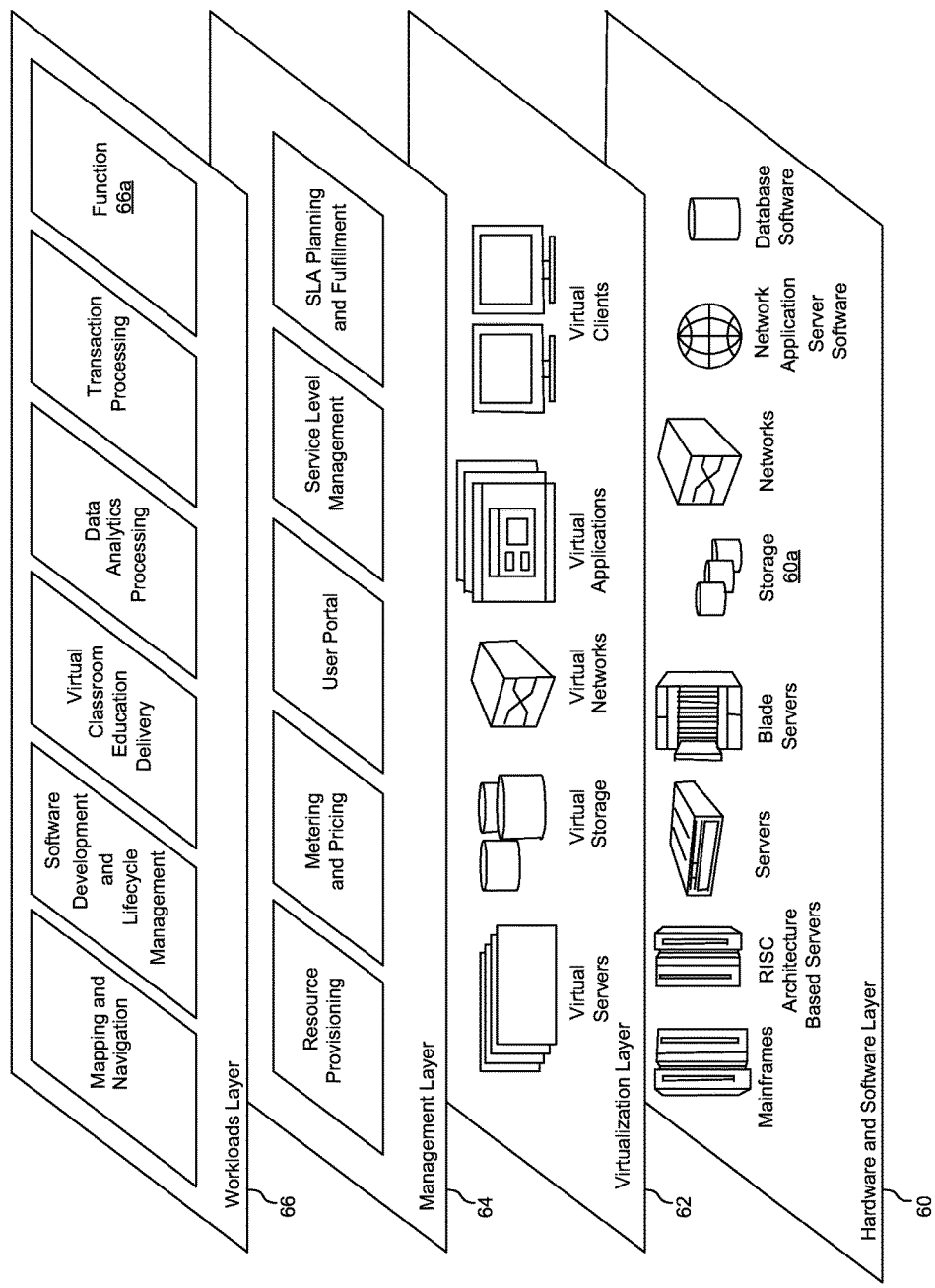
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; reduced instruction set computing (RISC) architecture based servers; servers; blade servers; storage 60a; storage devices; database software; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 provides the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
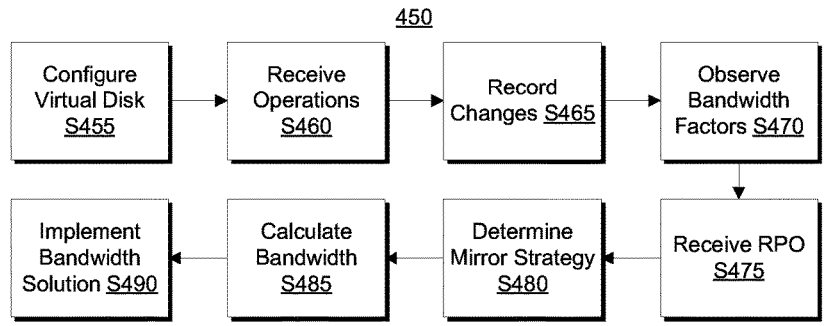
FIG. 4 is a flowchart showing a first embodiment method performed, at least in part, by the first embodiment system.
Figure 5:
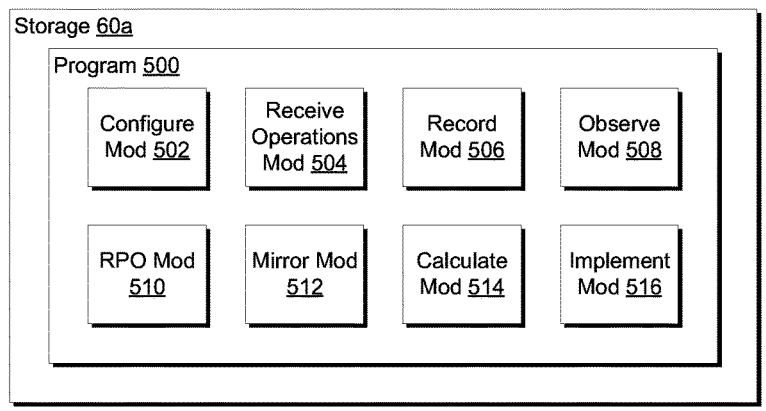
FIG. 5 is a block diagram view of a machine logic (for example, software) portion of the first embodiment system.

FIG. 4 shows flowchart 450 depicting a method according to the present invention. FIG. 5 shows program 500 for performing at least some of the method steps of flowchart 450. This method and associated software will now be discussed, over the course of the following paragraphs, with extensive reference to FIG. 4 (for the method step blocks) and FIG. 5 (for the software blocks). In some embodiments of the present invention, program 500 of FIG. 5 is stored in storage 60a (see FIG. 3).

Processing begins at step S455, where configure module ("mod") 502 configures a virtual disk to model a secondary set of data. In some embodiments of the present invention a primary set of data is maintained on a storage controller. In some embodiments of the present invention, the virtual disk is maintained on the storage controller. In some embodiments of the present invention, the primary set of data is maintained on a storage controller on a cloud computing node (e.g., a cloud computing node within cloud computing environment 50 (FIG. 2)). In some embodiments of the present invention, the virtual disk is maintained on the storage controller on the cloud computing node. In some embodiments of the present invention, the virtual disk is maintained in a remote location. In some embodiments of the present invention, the virtual disk is not in electronic communication with the primary set of data or the storage controller. In some embodiments of the present invention, the virtual disk is configured to include a virtual disk identification. In some embodiments of the present invention, the virtual disk is configured to model a set of secondary sets of data. In some embodiments of the present invention, the virtual disk is configured to analyze real time data. In some embodiments of the present invention, the virtual disk is configured to replicate a set of inter-site data transfers.

Processing proceeds to step S460, where receive operations mod 504 receives a set of operation instructions. In some embodiments of the present invention, the virtual disk receives a set of operation instructions from a storage controller on which the primary set of data is maintained. Alternatively, the virtual disk receives a set of operation instructions independent of the storage controller on which the primary set of data is maintained. In some embodiments of the present invention, the virtual disk receives a set of operation instructions after the set of operation instructions are received by a storage controller on which the primary set of data is maintained. Alternatively, the virtual disk receives a set of operation instructions substantially concurrently with the receipt of the set of operation instructions by a storage controller on which the primary set of data is maintained. Alternatively, the virtual disk receives a set of operation instructions before the set of operation instructions are received by a storage controller.

In some embodiments of the present invention, the virtual disk carries out the set of operation instructions on a set of virtual data. Alternatively, the virtual disk analyzes the instructions contained in the set of operation instructions and uses references to simulate commands on a set of data. In some embodiments of the present invention, the virtual disk receives a set of operation instructions formatted as a set of commands instructing operations to be carried out on a set of data. Alternatively, the virtual disk receives a set of operation instructions formatted as the result of a set of commands. In some embodiments of the present invention, the set of operation instructions are contemporary. Alternatively, the set of operation instructions are historical. In some embodiments of the present invention, the storage controller on which the primary set of data is maintained is decoupled from a storage controller on which a secondary set of data is maintained. In some embodiments of the present invention, the storage controller on which the primary set of data continues to transmit a set of operation instructions to a storage controller on which a secondary set of data is maintained. In some embodiments of the present invention, the virtual disk is configured to receive a set of operation relating to a set of primary sets of data.

Processing proceeds to step S465, where record mod 506 records a set of changes made to the virtual disk. In some embodiments of the present invention, the virtual disk receives the set of changes as a set of references related to a set of data and a set of operation instructions correlating to the set of references. Alternatively, the format in which the set of changes is received by the virtual disk is a set of current conditions for the set of data (from which the virtual disk determines a set of changes. In some embodiments of the current invention, a set of changes includes a first subset of changes that are dependent upon and must be executed after a second subset of changes. In some embodiments of the present invention, the set of changes received by the virtual disk are self-executing. Alternatively, the set of changes must be executed by the virtual disk. In some embodiments of the present invention the set of changes are not executed.

In some embodiments of the present invention, the virtual disk maintains the set of data in an original state and maintains a sequential record of all changes to be made to the set of data. Alternatively, the virtual disk maintains a set of data in an original state and maintains a net record of all changes to be made to the set of data. The net record includes only a single instruction for a subset of data points in the set of data, wherein execution of the single instruction changes the subset of data points from an original state to a current state. Alternatively, the virtual disk maintains a set of sets of operational instructions. In some embodiments of the present invention, the virtual disk maintains a set of information describing the set of changes to the set of data. The set of information includes, but is not limited to, at least one of: (i) a set of data reference points; (ii) a set of initial conditions for a set of data; (iii) a set of current conditions for a set of data; (iv) a set of independent commands to be executed on a set of data; (v) a first set of commands dependent upon a second set of other commands, whereby the second set of commands must be executed prior to execution of the first set of commands; and/or (vi) a set of independent commands operating on a set of data, whereby comparison of an initial condition for the set of data to a current condition for the set of data reduces the set of independent commands to a single combined command.

Processing proceeds to step S470, where observe mod 508 observes a set of bandwidth factors. In this example, the set of bandwidth factors includes the rate at which a set of changes is executed ("write rate"). In other embodiments of the present invention, the set of bandwidth factors includes, but is not limited to: (i) a number of changes within the set of changes for which the execution of those changes is not dependent upon prior execution of a subset of changes ("parallel writes"); (ii) a number of changes within the set of changes for which the execution of those changes is dependent on prior execution of a subset of changes ("dependent writes"); (iii) a subset of changes within the set of changes for which the concurrent execution of those changes is required ("interdependent writes"); (iv) a subset of changes within the set of changes for which the subset of changes act on a subset of data points within the set of data ("overlapping writes"); (v) the maximum write rate; (vi) the duration of the maximum write rate; (vii) the frequency with which a subset of data points are accessed; (viii) the time of day during which a subset of data points are accessed; (ix) any compression of the set of changes; (x) the percentage of the set of data affected by the set of changes ("data change rate"); (xi) spikes in the write rate; (xii) overlapping writes; (xiii) data change rate; and/or (xiv) a set of writes that operate on the same set of data points and can be combined into a single write ("data de-duplication").

In some embodiments of the present invention, the virtual disk continuously observes the set of bandwidth factors. Alternatively, the virtual disk observes the set of bandwidth factors periodically. In some embodiments of the present invention, the virtual disk operates for a determined period of time. In some embodiments of the present invention, the period of time during which the virtual disk operates is an input. In some embodiments of the present invention, the virtual disk receives an input to stop observing the set of bandwidth factors. In some embodiments of the present invention, the virtual disk is configured to monitor multiple sets of bandwidth factors. In some embodiments of the present invention, the virtual disk is configured to monitor the bandwidth factors over a period of time, which is divided into epochs. In some embodiments of the present invention, the epoch length is determined as an input. In some embodiments of the present invention, bandwidth factors are observed on an epoch-by-epoch basis. In some embodiments of the present invention, the epoch for a first primary data set is different than the epoch for a second primary data set. Alternatively, the respective epochs for the set of primary data sets are the same. In some embodiments of the present invention, a snapshot is taken at the end of each epoch. In some embodiments of the present invention, a snapshot represents the then-current status of the virtual disk. Alternatively, the snapshot represents the net changes in the set of data that occurred during the epoch. In some embodiments of the present invention, the snapshot is a bitmap. In some embodiments of the present invention, the sets of bandwidth factors correlate to multiple primary sets of data, respectively.

Processing proceeds to step S475, where RPO mod 510 receives a recovery point objective (RPO). The RPO is a function of a time period. In this example, the RPO is received as an input. In other embodiments of the present invention, the RPO is predetermined. In some embodiments of the present invention, the RPO is converted into a different unit of time. In some embodiments of the present invention, a set of RPOs are received, correlating to multiple primary sets of data, respectively. In some embodiments of the present invention, the RPO equals the length of an epoch.

Processing proceeds to step S480, where mirror mod 512 determines a mirror strategy. A mirror strategy is a manner in which a set of operation instructions is passed to a secondary set of data. Examples of minor strategies are: synchronous minoring, continuous asynchronous minoring, and periodic asynchronous mirroring. In some embodiments of the present invention, the virtual disk determines that a synchronous minor strategy is used. For example, if the RPO received is zero, a synchronous mirror strategy is used. In some embodiments of the present invention, the virtual disk determines that a continuous asynchronous minor strategy is used. For example, if the virtual disk observes a large number of dependent writes and the RPO received is non-zero, a continuous asynchronous mirror strategy is used. Alternatively, the virtual disk determines that a periodic asynchronous mirror strategy is used. For example, if the virtual disk observes a large number of instances where data de-duplication should be used and the RPO received is non-zero, a periodic asynchronous minor strategy is used.

In some embodiments of the present invention, determination of a mirror strategy is dependent on the RPO. In some embodiments of the present invention, determination of a minor strategy is dependent on the set of bandwidth factors. In some embodiments of the present invention, the virtual disk determines the minor strategy based on an input. In some embodiments of the present invention, a best minor strategy is determined. For example, if a non-zero RPO is received and there are a large number of dependent writes and a large number of instances where data de-duplication should be used, both a continuous asynchronous mirror strategy and a periodic asynchronous mirror strategy are viable implementations. However, a periodic asynchronous mirror strategy requires less bandwidth and is cheaper to implement, therefore the periodic asynchronous minor strategy is the "best" minor strategy for that situation. In some embodiments of the present invention, the mirror strategy is then received as an input. In some embodiments of the present invention, a set of mirror strategies are determined, correlating to multiple primary sets of data, respectively.

Processing proceeds to step S485, where calculate mod 514 calculates the bandwidth required. In some embodiments of the present invention, the virtual disk determines the bandwidth required based on the bandwidth factors. Alternatively, the virtual disk determines the bandwidth required based on the mirror strategy. Alternatively, the virtual disk determines the bandwidth required based on the RPO. In some embodiments of the present invention, the bandwidth required is calculated such that the RPO is never exceeded. In some embodiments of the present invention, the bandwidth required is calculated such that a buffer is added to the RPO (i.e., the RPO is decreased). Alternatively, the bandwidth required is calculated and a buffer is added (e.g., the bandwidth required is multiplied by a factor greater than one) to increase the likelihood that the RPO is not exceeded. In some embodiments of the present invention, spikes in the write rate are included in calculating the bandwidth required. In some embodiments of the present invention, the bandwidth required is depicted in a graphical manner. In some embodiments of the present invention, the bandwidth required is depicted as a probabilistic curve. In some embodiments of the present invention, a set of bandwidths are required, correlating to multiple primary sets of data, respectively.

Processing terminates at step S490, where implement mod 516 implements the bandwidth solution. In the present example, the bandwidth solution represents a data communication between the storage controller maintaining the primary data set (the primary storage controller) and the storage controller maintaining the secondary data set (the secondary storage controller). In other embodiments of the present invention, the bandwidth solution represents a data communication between a source of a set of operation instructions and the secondary storage controller. In some embodiments of the present invention, the primary storage controller and the secondary storage controller are the same storage controller. In some embodiments of the present invention, implementation of the bandwidth solution includes reestablishing a data communication channel between the primary storage controller and the secondary storage controller. In some embodiments of the present invention, the primary storage controller maintains is electrical connection with secondary storage controller during the process outlined by flowchart 400. In some embodiments of the present invention, the electrical connection between the primary storage controller and the secondary storage controller is disconnected during step S455. In some embodiments of the present invention, implementation of the bandwidth solution requires reconnecting the electrical connection between the primary storage controller and the secondary storage controller.

In some embodiments of the present invention, the bandwidth solution is configured to a specified disaster recovery setup. In some embodiments of the present invention, implementation of the bandwidth solution includes purchasing physical media across which a set of operation instruction is transmitted. In some embodiments of the present invention, implementation of the bandwidth solution includes reallocation of physical media across which a set of operation instruction is transmitted. Alternatively, implementation of the bandwidth solution includes reduction of physical media across which a set of operation instruction is transmitted. In some embodiments of the present invention, a set of bandwidth solutions are implemented corresponding to multiple sets of primary data, respectively. In some embodiments of the present invention, processing returns to step S460. For example, processing would return to step S460 if a company wanted to dynamically monitor the new implementation or if the company wanted to be aware of potential future issues related to bandwidth usage.

III. Further Comments and/or Embodiments

Some embodiments of the present invention recognize the following facts, potential problems, and/or potential areas for improvement with respect to the current state of the art: (i) current bandwidth solutions result in underutilization of resources; (ii) current bandwidth solutions result in resource bottlenecks (under-provisioning of resources); and/or (iii) current solutions fail to account for complex realities.

Figure 6:
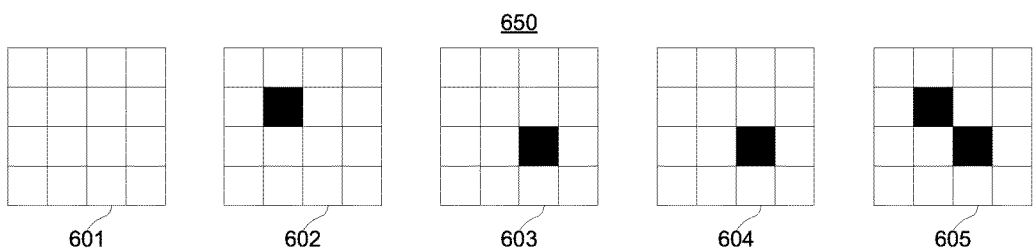
FIG. 6 is a block diagram view of a data environment for a modeled secondary set of data according to a second embodiment system of the present invention.

FIG. 6 is a block diagram view of a data environment for a modeled secondary set of data according to a second embodiment system of the present invention. In some embodiments of the present invention, the virtual disk records changes to the modeled secondary set of data over an epoch.

In this embodiment, block 601 represents the initial state of the modeled secondary set of data. Each cell in block 601 represents a piece of data. Because this is the initial state of the modeled secondary set of data, each piece of data is unchanged.

In this embodiment, block 602 represents a change to a first piece of data in the set of data, caused by a first operation in a set of operation instructions. In this embodiment, block 603 represents a change to a second piece of data in the set of data, caused by a second operation in the set of operation instructions. In block 603, only one piece of data was changed by the second operation, therefore only the one piece of data is represented as having been changed by the virtual disk. In this embodiment, block 604 represents a change to the second piece of data in the set of data, cause by a third operation in the set of operation instructions.

In this embodiment, block 605 represents a snapshot of the total changes during the epoch that began when the modeled secondary set of data was in the initial state (block 601). In this embodiment, the combined changes made by the virtual disk as a result of the set of operation instructions appear in block 605 as a single change. This is an example of data de-duplication. For example, if the second operation changed the second piece of data from the number "1" to the number "3," and the third operation changed the second piece of data from the number "3" to the number "5," the combined change represented by block 605 depicts the change in the second piece of data from the number "1" to the number "5."

Some embodiments of the present invention implement a monitor mode for a given virtual disk. In these embodiments, the monitor mode simulates a relationship between a local volume and a remote volume to collect various statistics. In some embodiments of the present invention, these statistics include: data write rate; data access frequency; duration for peak write loads; and peak load hours during a day. The data access frequency relates to various sectors/extents and is measured at different times of day. The duration for peak write loads statistic is used to analyze and generate statistical charts for visual aid and to generate intelligent advice on bandwidth provisioning for the data replication link. In some embodiments of the present invention, the monitor mode for a virtual disk acting as a remote copy is an administrative mechanism to configure a virtual disk to behave as if the virtual disk were configured for one of the remote copy mechanisms supported by the storage controller. However, in these embodiments, the monitor mode does not require a relationship and/or a physical link between the two sites. In some embodiments of the present invention, while configuring a virtual disk in monitor mode, an administrator specifies the set of virtual disk identifications (IDs) and the cycle period (RPO) for the relationship. The storage controller then collects data-change information including: (i) write rate; (ii) overlapping writes; and/or (iii) data change rate. In some embodiments of the present invention, the data-change information is represented graphically to assist in making decisions including: (i) link bandwidth; (ii) provisioning at different times of the day; and/or (iii) the most effective remote copy configuration for an application.

Some embodiments of the present invention may include one, or more, of the following features, characteristics, and/or advantages: (i) improve calculation of bandwidth between storage controllers for primary and secondary sets of data; (ii) use of variety of bandwidth factors (indicators) to optimize bandwidth implementation; (iii) remove ad hoc estimates as to bandwidth requirement; (iv) increase predictability of disaster recovery solutions; (v) observe bandwidth usage trends; and/or (vi) depict bandwidth requirements in a graphical manner.

Some embodiments of the present invention may include one, or more, of the following features, characteristics, and/or advantages: (i) eliminates under-utilization of resources; (ii) effectively schedules resource usage; (iii) accurately and precisely calculates bandwidth requirements for data transfer based on actual workloads; (iv) simplifies data collection and monitoring for bandwidth factors; (v) centralizes data collection; and/or (vi) eliminates discrepancies based on converting among operating systems.

Some embodiments of the present invention may include one, or more, of the following features, characteristics, and/or advantages: (i) implements a variety of mirror strategies; (ii) simplifies bandwidth requirement determinations; (iii) observes a variety of parameters affecting data transfer rates; (iv) advises the bandwidth required for maximizing RPO and cost; (v) implements a use-what-you-need bandwidth solution; and/or (vi) observes bandwidth factors that are more difficult to observe using a different setup.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically connected: means either directly electrically connected, or indirectly electrically connected, such that intervening elements are present; an electrical connection may include, but need not be limited to, elements such as capacitors, inductors, transformers, vacuum tubes, and the like.

Mechanically connected: includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication, and communication routes that have wireless and wired portions; data communication is not necessarily limited to: (i) direct data communication; (ii) indirect data communication; and/or (iii) data communication where the format, packetization status, medium, encryption status, and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving a recovery point objective (RPO), wherein the RPO includes a non-zero time period, the RPO tracking a maximum amount of data that can be lost in a disaster scenario;
   receiving a set of operation instructions from a first data storage controller to a virtual disk modeling a second data storage controller;
   simulating, using the virtual disk, a performance of the set of operation instructions to replicate a set of inter-site data transfers between the first data storage controller and the second data storage controller;
   collecting a set of data correlating to a set of bandwidth factors, based on the simulated performance of the set of operation instructions;
   determining a mirror strategy correlating to a respective primary set of data of multiple primary sets of data, wherein the mirror strategy includes a manner in which the set of operation instructions is passed to a secondary set of data for the respective primary set of data;
   calculating, using the virtual disk, a bandwidth required for data replication for disaster recovery, based, at least in part, on the set of bandwidth factors, the RPO, and the mirror strategy; and
   implementing the calculated bandwidth in a data communication for data replication for disaster recovery between the first data storage controller maintaining the primary data set and the second data storage controller maintaining the secondary data set mirroring the first data set;
   wherein:
      at least the collecting step is performed by computer software running on computer hardware, and
      the mirror strategy to avoid data duplication is one of continuous asynchronous or periodic asynchronous, wherein the periodic asynchronous mirror strategy requires less bandwidth to implement than the continuous asynchronous mirror strategy.

2. The method of claim 1, wherein the simulated performance of the set of operation instructions is performed on a set of virtual data on the virtual disk maintained in a remote location to simulate a relationship between the first data storage controller and the second data storage controller.

3. The method of claim 1, wherein the set of bandwidth factors includes a set of de-duplicated writes, a set of dependent writes, a set of parallel writes, and a set of interdependent writes.

4. The method of claim 1, wherein calculating the bandwidth includes a buffer.

5. The method of claim 1, further comprising:
   disconnecting a data communication channel between the first data storage controller and the second data storage controller.

6. A computer program product comprising a computer readable storage medium having stored thereon:
   first program instructions programmed to receive a recovery point objective (RPO), wherein the RPO includes a non-zero time period, and receive a set of operation instructions from a first data storage controller to a virtual disk modeling a second data storage controller, the RPO tracking a maximum amount of data that can be lost in a disaster scenario;
   second program instructions programmed to simulate, using the virtual disk, a performance of the set of operation instructions to replicate a set of inter-site data transfers between the first data storage controller and the second data storage controller;

third program instructions programmed to collect a set of data correlating to a set of bandwidth factors, based on the simulated performance of the set of operation instructions;

fourth program instructions to determine a mirror strategy correlating to a respective primary set of data of multiple primary sets of data, wherein the mirror strategy includes a manner in which the set of operation instructions is passed to a secondary set of data for the respective primary set of data;

fifth program instructions programmed to calculate, using the virtual disk, a bandwidth required for data replication for disaster recovery, based, at least in part, on the set of bandwidth factors, the RPO, and the mirror strategy; and sixth program instructions programmed to implement the calculated bandwidth in a data communication for data replication for disaster recovery between the first data storage controller maintaining the primary data set and the second data storage controller maintaining the secondary data set mirroring the first data set, wherein the mirror strategy to avoid data duplication is one of continuous asynchronous or periodic asynchronous, wherein the periodic asynchronous mirror strategy requires less bandwidth to implement than the continuous asynchronous mirror strategy.

7. The computer program product of claim 6,
wherein the simulated performance of the set of operation instructions is performed on a set of virtual data on the virtual disk maintained in a remote location to simulate a relationship between the first data storage controller and the second data storage controller.

8. The computer program product of claim 6, wherein the set of bandwidth factors includes a set of de-duplicated writes, a set of dependent writes, a set of parallel writes, and a set of interdependent writes.

9. The computer program product of claim 6, wherein the fourth program instructions programmed to calculate the bandwidth includes a buffer.

10. The computer program product of claim 6, further comprising:
seventh program instructions programmed to disconnect a data communication channel between a first data storage controller and a second data storage controller.

11. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to receive a recovery point objective (RPO), wherein the RPO includes a non-zero time period, and receive a set of operation instructions from a first data storage controller to a virtual disk modeling a second data storage controller, the RPO tracking a maximum amount of data that can be lost in a disaster scenario;
second program instructions programmed to simulate, using the virtual disk, a performance of the set of operation instructions to replicate a set of inter-site data transfers between the first data storage controller and the second data storage controller;
third program instructions programmed to collect a set of data correlating to a set of bandwidth factors, based on the simulated performance of the set of operation instructions;
fourth program instructions to determine a mirror strategy correlating to a respective primary set of data of multiple primary sets of data, wherein the mirror strategy includes a manner in which the set of operation instructions is passed to a secondary set of data for the respective primary set of data;
fifth program instructions programmed to calculate, using the virtual disk, a bandwidth required for data replication for disaster recovery, based, at least in part, on the set of bandwidth factors, the RPO, and the mirror strategy; and
sixth program instructions programmed to implement the calculated bandwidth in a data communication for data replication for disaster recovery between the first data storage controller maintaining the primary data set and the second data storage controller maintaining the secondary data set mirroring the first data set,
wherein the mirror strategy to avoid data duplication is one of continuous asynchronous or periodic asynchronous, wherein the periodic asynchronous mirror strategy requires less bandwidth to implement than the continuous asynchronous mirror strategy.

12. The computer system of claim 11, wherein the simulated performance of the set of operation instructions is performed on a set of virtual data on the virtual disk maintained in a remote location to simulate a relationship between the first data storage controller and the second data storage controller.

13. The computer system of claim 11, wherein the set of bandwidth factors includes a set of de-duplicated writes, a set of dependent writes, a set of parallel writes, and a set of interdependent writes.

14. The computer system of claim 11, wherein the fourth program instructions programmed to calculate the bandwidth includes a buffer.

15. The computer system of claim 11, further comprising:
seventh program instructions programmed to disconnect a data communication channel between the first data storage controller and a second data storage controller.

* * * * *